US012289818B2

(12) United States Patent
Feng et al.

(10) Patent No.: US 12,289,818 B2
(45) Date of Patent: Apr. 29, 2025

(54) DRAWER TYPE MICROWAVE OVEN

(71) Applicants: GUANGDONG GALANZ ENTERPRISES CO., LTD., Guangdong (CN); GUANGDONG GALANZ MICROWAVE ELECTRICAL APPLIANCES MANUFACTURING CO., LTD., Guangdong (CN)

(72) Inventors: Liangwang Feng, Foshan (CN); Feng Li, Foshan (CN)

(73) Assignees: GUANGDONG GALANZ ENTERPRISES CO., LTD., Foshan (CN); GUANGDONG GALANZ MICROWAVE ELECTRICAL APPLIANCES MANUFACTURING CO., LTD., Guangdong (CN)

(*) Notice: Subject to any disclaimer, the term of this patent is extended or adjusted under 35 U.S.C. 154(b) by 867 days.

(21) Appl. No.: 17/442,265

(22) PCT Filed: Nov. 20, 2020

(86) PCT No.: PCT/CN2020/130656
§ 371 (c)(1),
(2) Date: Sep. 23, 2021

(87) PCT Pub. No.: WO2021/115107
PCT Pub. Date: Jun. 17, 2021

(65) Prior Publication Data

US 2022/0159796 A1 May 19, 2022

(30) Foreign Application Priority Data

Dec. 11, 2019 (CN) ........................ 201911268990.6

(51) Int. Cl.
*H05B 6/64* (2006.01)
*F24C 15/16* (2006.01)
*H05B 6/68* (2006.01)

(52) U.S. Cl.
CPC ......... *H05B 6/6414* (2013.01); *F24C 15/168* (2013.01); *H05B 6/642* (2013.01); *H05B 6/686* (2013.01); *H05B 2206/044* (2013.01)

(58) Field of Classification Search
CPC .... H05B 6/642; H05B 6/6473; H05B 6/6414; H05B 6/686; H05B 2206/044; F24C 15/168
(Continued)

(56) References Cited

U.S. PATENT DOCUMENTS 4,421,968 A 12/1983 Osepchuk
2006/0191925 A1* 8/2006 Iwamoto ................ A47B 77/08
219/757

(Continued)

FOREIGN PATENT DOCUMENTS

CN 104613512 A 5/2015
CN 104633727 A 5/2015
(Continued)

OTHER PUBLICATIONS

International Search Report for corresponding PCT Application No. PCT/CN2020/130656 dated Feb. 2, 2021, 5 pages.
(Continued)

*Primary Examiner* — Jimmy Chou
*Assistant Examiner* — William C. Gibson
(74) *Attorney, Agent, or Firm* — Taft Stettinius & Hollister LLP

(57) ABSTRACT

The present disclosure relates to a drawer-type microwave oven comprising a cooker body, a door, a first slide rail, a second slide rail, a driving motor, a magnetron and a first
(Continued)

fan. The cooker body includes a housing and a cooking cavity provided within the housing. The magnetron and the first fan are provided in the third spacing region, the housing is provided with an air inlet mesh that is in communication with the third spacing region. Cold air entering from the air inlet mesh is guided to flow through the magnetron and the driving motor in sequence when the first fan works. When the drawer-type microwave oven works, the first fan draws the cold air into the third spacing region through the air inlet mesh, and the cold air flows through the magnetron and the driving motor in sequence, which can dissipate the heat from the driving motor well, thereby reducing the temperature of the driving motor and ensuring the long-term normal operation of the driving motor and prolonging its service life.

11 Claims, 8 Drawing Sheets

(58) Field of Classification Search
USPC .......................................................... 219/757
See application file for complete search history.

(56) References Cited

U.S. PATENT DOCUMENTS

| | | | | |
|---|---|---|---|---|
| 2010/0200563 | A1 | 8/2010 | Yoshidome | |
| 2017/0171921 | A1* | 6/2017 | Nasu | H05B 6/6414 |

FOREIGN PATENT DOCUMENTS

| | | | |
|---|---|---|---|
| CN | 106322454 | A | 1/2017 |
| CN | 206300225 | U | 7/2017 |
| CN | 207432732 | U | 6/2018 |
| CN | 110848763 | A | 2/2020 |
| CN | 211822535 | U | 10/2020 |
| KR | 200152104 | Y1 * | 7/1999 |

OTHER PUBLICATIONS

Written Opinion for corresponding PCT Application No. PCT/CN2020/130656 dated Feb. 2, 2021, 5 pages.
Chinese Patent Office, Notice of Allowance issued in corresponding Application No. 201911268990.6, dated Jan. 2, 2025, 6 pp.

* cited by examiner

DRAWER TYPE MICROWAVE OVEN

CROSS REFERENCE TO RELATED APPLICATIONS

This is a U.S. National Stage application of, and claims priority to, PCT/CN2020/130656, filed Nov. 20, 2020, which further claims priority to Chinese Patent Application No. 201911268990.6, filed Dec. 11, 2019, the disclosures of which are incorporated herein by reference in their entirety.

TECHNICAL FIELD

The present disclosure relates to the field of microwave oven technology, particularly to a drawer-type microwave oven.

BACKGROUND

The connection structure between the door and the cooker body of the microwave oven is hinged connection or sliding rail connection, wherein, the hinged manner is used for a rotating door, and the sliding rail connection is used for a drawer-type door, and the complete machine is usually called a drawer-type microwave oven. Wherein, the drawer-type microwave oven uses a driving motor to drive the slide rail to move back and forth, thereby achieving automatic open or close of the door. Generally, an electrical heated tube can be added in the cooker body of the drawer-type microwave oven in order to improve the heating speed or increase the food cooking function, such as grilling. Since the temperature generated by the electrical heated tube is very high, when the electrical heated tube is used for heating, the temperature in the cooking cavity will reach more than 200 degree. However, the heat-resistant temperature of the conventional driving motor is generally below 80 degree and, due to the limitation of the cooker body space, the driving motor is generally arranged near the metal cooking cavity. Thus, the high temperature in the cooking cavity will be transmitted to the driving motor, thereby affecting the performance and lifetime of the driving motor.

SUMMARY

In view of this, it is necessary to overcome the defects of the prior art and provide a drawer-type microwave oven so that the drive motor can have good heat dissipation.

The technical solutions are as follows.

A drawer-type microwave oven, comprising: a cooker body and a door, the cooker body including a housing and a cooking cavity provided within the housing, and both of the housing and the cooking cavity being provided with an opening corresponding to the door that is openable to cover the opening, the housing including a rear cover plate, a first side cover plate and a second side cover plate that are arranged oppositely, the first side cover plate and the second side cover plate being both connected to the rear cover plate, a first spacing region being formed between the first side cover plate and a cavity wall of the cooking cavity corresponding with the first side cover plate, and a second spacing region being formed between the second side cover plate and a cavity wall of the cooking cavity corresponding with the second side cover plate, a third spacing region being formed between the rear cover plate and a cavity wall of the cooking cavity corresponding with the rear cover plate, and the third spacing region being in communication with the second spacing region; a first slide rail, a second slide rail, and a driving motor, the first slide rail and the second slide rail respectively being arranged in the first spacing region and the second spacing region, the driving motor being arranged in the second spacing region, the first slide rail and the second slide rail each including a fixed rail fixed on the cooker body and a movable rail slidably arranged on the fixed rail, and the driving motor being configured to drive the movable rail of the second slide rail to move, the movable rail being connected to the door; and a magnetron and a first fan arranged in the third spacing region, the housing being provided with an air inlet mesh being in communication with the third spacing region, cold air entering from the air inlet mesh being guided to flow through the magnetron and the driving motor in sequence when the first fan works.

When the drawer-type microwave oven works, the first fan draws the cold air into the third spacing region through the air inlet mesh, and the cold air flows through the magnetron and the driving motor in sequence, which can dissipate the heat from the driving motor well, thereby reducing the temperature of the driving motor and ensuring the long-term normal operation of the driving motor and prolonging its service life.

In one embodiment, the housing further includes a bottom cover plate connected to the rear cover plate, the first side cover plate and the second side cover plate, respectively. A fourth spacing region that is in communication with the second spacing region is formed between the bottom cover plate and the cavity wall of the cooking cavity corresponding with the bottom cover plate, a bottom partition plate is provided in the fourth spacing region, and a bottom space of the first spacing region is separated from a bottom space of the second spacing region by the bottom partition plate. The driving motor is arranged at a location where the second spacing region intersects with the fourth spacing region.

In one embodiment, the drawer-type microwave oven further includes a hot air assembly and a front plate. The housing further includes a top cover plate connected to the rear cover plate, the first side cover plate, and the second side cover plate, respectively. A fifth spacing region is formed between the top cover plate and a cavity wall of the cooking cavity corresponding with the top cover plate, and the fifth spacing region is in communication with the first spacing region and the second spacing region, respectively. The hot air assembly is arranged in the fifth spacing region. The front plate is circumferentially arranged around the opening of the cooking cavity, a bottom of the front plate is provided with a front side air outlet hole penetrating the front plate, the front side air outlet hole is in communication with the first spacing region, and the front plate blocks the second spacing region. When the door is closed, the door is attached to the front plate to seal the opening.

In one embodiment, the drawer-type microwave oven further includes a first air guide cover. The cavity wall of the cooking cavity corresponding with the rear cover plate is provided with an air intake mesh, a radiator shell of the magnetron is provided with a first lateral ventilation flow channel, the first air guide cover covers the air intake mesh, an air outlet of the first fan, the first lateral ventilation flow channel, and an air inlet of the first air guide cover are in communication in sequence, and an air outlet of the first air guide cover is in communication with the second spacing region.

In one embodiment, the drawer-type microwave oven further includes a variable frequency power source and a second fan, both of which are arranged in the third spacing region. The second fan is configured to dissipate heat of the variable frequency power source.

In one embodiment, the air inlet mesh includes a side air inlet mesh, a bottom air inlet mesh and a rear air inlet mesh. One of corner parts of the first side cover plate that is adjacent to the rear cover plate and the bottom cover plate is provided with the side air inlet mesh, one of corner parts of the bottom cover plate that is adjacent to the first side cover plate and the rear cover plate is provided with the bottom air inlet mesh, and one of corner parts of the rear cover plate that is adjacent to the first side cover plate and the bottom cover plate is provided with the rear air inlet mesh. The plane where an air inlet of the second fan is located is slantwise arranged relative to the bottom cover plate, the plane where the air inlet of the second fan is located faces the side air inlet mesh and the bottom air inlet mesh. The plane where an air outlet of the second fan is located is arranged opposite to the variable frequency power source, the plane where an air inlet of the first fan is located faces the bottom air inlet mesh, and the plane where the air outlet of the first fan is located is arranged opposite to the magnetron.

In one embodiment, a side of the cavity wall of the cooking cavity corresponding with the top cover plate away from the door is provided with a lateral surrounding edge. The lateral surrounding edge is attached to the top cover plate, and two ends of the lateral surrounding edge are spaced apart from the first side cover plate and the second side cover plate, respectively.

In one embodiment, the lateral surrounding edge includes a main body surrounding edge and an arc-shaped surrounding edge connected to one end of the main body surrounding edge, the arc-shaped surrounding edge is configured to guide the air to the first spacing region. The cavity wall of the cooking cavity corresponding with the top cover plate is further provided with a guide edge, a ventilation interval is provided between the guide edge and another end of the main body surrounding edge, and the guide edge extends toward a middle part of the cooking cavity.

In one embodiment, the drawer-type microwave oven further includes a side heat insulation plate provided in the second spacing region and a bottom heat insulation plate provided in the fourth spacing region. The side heat insulation plate is located between the cavity wall of the cooking cavity corresponding with the second side cover plate and the second slide rail, and the bottom of the side heat insulation plate is connected to the bottom heat insulation plate.

In one embodiment, a front end of the fixed rail of the second slide rail is connected to the front plate, and a rear end of the fixed rail of the second slide rail is fixedly connected to a side edge plate of the cooking cavity.

In one embodiment, the cavity wall of the cooking cavity corresponding with the top cover plate has an upper edge plate extending along the direction of the second side cover plate, the top of the side heat insulation plate is provided with an upper bending edge connected to the upper edge plate, the bottom of the side heat insulation plate is provided with a lower bending edge connected to the bottom heat insulation plate. The side of the side heat insulation plate is provided with a blank holder abutting against the cavity wall of the cooking cavity corresponding with the second side cover plate.

In one embodiment, the drawer-type microwave oven further includes a mounting bracket, the bottom side of the fixed rail of the second slide rail is connected to a connecting part, the driving motor is mounted on the mounting bracket, and the mounting bracket is connected to the lower bending edge and the connecting part, respectively.

In one embodiment, the connecting part includes a first connecting plate and a second connecting plate, the first connecting plate is connected to the fixed rail of the second slide rail, and the second connecting plate is connected to the first connecting plate; the first connecting plate abuts against the side heat insulation plate or is arranged adjacent to the side heat insulation plate.

REFERENCE NUMERALS

Figure 1:
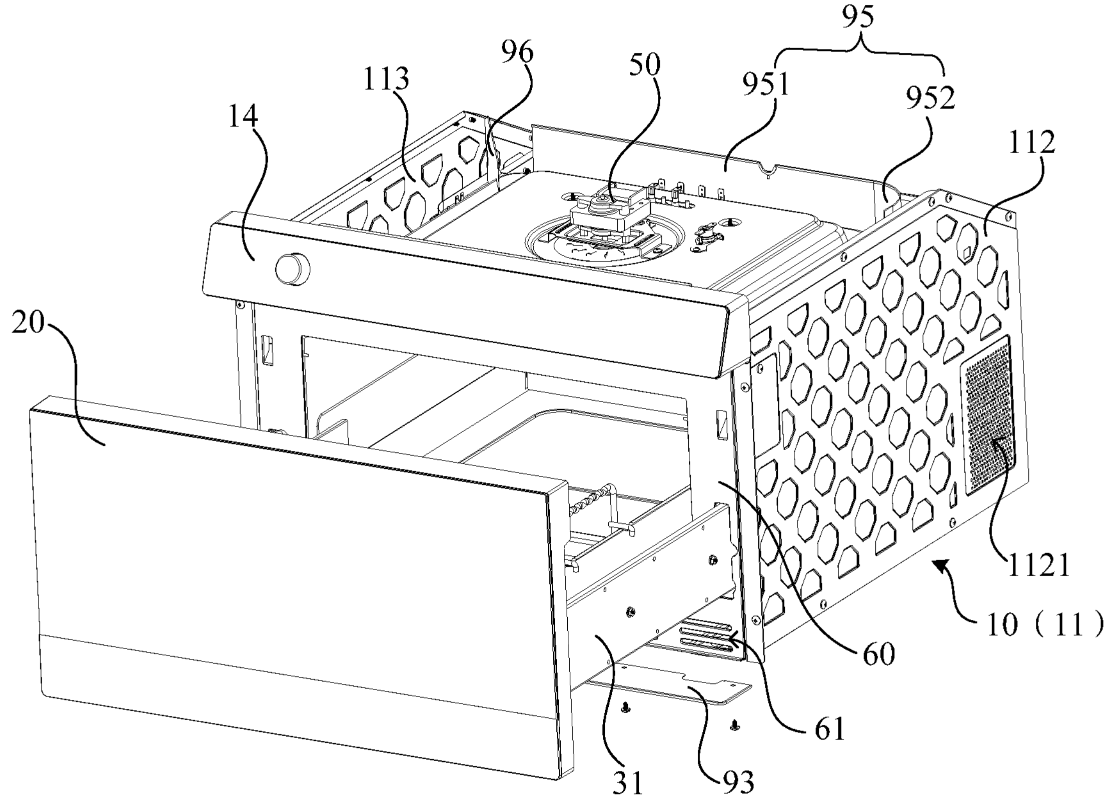
FIG. 1 is a structural view showing a drawer-type microwave oven with a door pull opened according to an embodiment of the present disclosure.

10. cooker body; 11. housing; 111. rear cover plate; 1111. rear air inlet mesh; 112. first side cover plate; 1121. side air inlet mesh; 113. second side cover plate; 114. bottom cover plate; 1141. bottom air inlet mesh; 1142. supporting leg; 115. top cover plate; 12. cooking cavity; 121. air intake mesh; 122. lower edge plate; 1221. first vent; 123. side edge plate; 124. upper edge plate; 13. bottom partition plate; 14. control box; 20. door; 31. first slide rail; 32. second slide rail; 321. fixed rail; 322. movable rail; 33. driving motor; 34. connecting part; 341. first connecting plate; 342. second connecting plate; 41. magnetron; 411. radiator shell; 412. power connector; 42. first fan; 421. fan motor; 43. variable frequency power source; 431. shell; 44. second fan; 45. ventilation gap; 46. side heat insulation plate; 461. upper bending edge; 462. lower bending edge; 463.

blank holder; 47. bottom heat insulation plate; 50. hot air assembly; 51. heating tube; 52. hot stirring fan; 53. hot air motor; 60. front plate; 61. front side air outlet hole; 70. first air guide cover; 71. heat conducting edge; 80. second air guide cover; 91. vertical partition plate; 911. third vent; 92. lateral partition plate; 921. fourth vent; 93. first partition plate; 94. front side air outlet; 95. lateral surrounding edge; 951. main body surrounding edge; 952. arc-shaped surrounding edge; 96. guide edge; 97. ventilation interval; 98. mounting bracket.

DETAILED DESCRIPTION OF THE EMBODIMENTS

The above objects, features, and advantages of the present disclosure will become more apparent by describing in detail embodiments thereof with reference to the accompanying drawings. In the following description, numerous specific details are set forth in order to provide a thorough understanding of the present disclosure. However, the present disclosure can be implemented in many other ways than those described herein, and similar modifications may be made by those skilled in the art without departing from the scope of the disclosure. Therefore, the present disclosure is not limited to the specific embodiments disclosed below.

In the description of the present disclosure, it should be understood that the terms “first” and “second” are merely used for descriptive purposes, and cannot be understood to indicate or imply relative importance or implicitly indicate the number of technical features indicated. Therefore, the features defined by “first” and “second” may explicitly or implicitly include at least one of the features. In the description of the present disclosure, “plurality” means at least two, such as two, three, etc., unless specifically defined otherwise.

In the description of the present disclosure, it should be understood that, when an element is considered to be “connected to” another element, it can be directly connected to another element or indirectly connected to another element with an intermediate element. Instead, when an element is referred to as being “directly” connected to another element, there is no intermediate element.

In one embodiment, referring to FIG. 1 and FIGS. 4 to 11, the drawer-type microwave oven may include a cooker body 10, a door 20, a first slide rail 31, a second slide rail 32, a driving motor 33, a magnetron 41 and a first fan 42. The cooker body 10 may include a housing 11 and a cooking cavity 12 arranged within the housing 11. Both of the housing 11 and the cooking cavity 12 are provided with an opening corresponding to the door 20. The door 20 is openable to cover the opening, the housing 11 includes a rear cover plate 111, and a first side cover plate 112 and a second side cover plate 113 arranged oppositely. The first side cover plate 112 and the second side cover plate 113 are both connected to the rear cover plate 111, and a first spacing region is formed between the first side cover plate 112 and a cavity wall of the cooking cavity 12 corresponding with the first side cover plate. A second spacing region is formed between the second side cover plate 113 and a cavity wall of the cooking cavity 12 corresponding with the second side cover plate. A third spacing region is formed between the rear cover plate 111 and a cavity wall of the cooking cavity 12 corresponding with the rear cover plate, and the third spacing region is in communication with the second spacing region.

The first slide rail 31 and the second slide rail 32 are respectively arranged in the first spacing region and the second spacing region, and the driving motor 33 is arranged in the second spacing region, the first slide rail 31 and the second slide rail 32 each include a fixed rail 321 fixed on the cooker body 10 and a movable rail 322 slidably arranged on the fixed rail 321. The driving motor 33 is configured to drive the movable rail 322 of the second slide rail 32 to move, and the movable rail 322 is connected to the door 20.

The magnetron 41 and the first fan 42 are arranged in the third spacing region, the housing 11 is provided with an air inlet mesh that is in communication with the third spacing region. When the first fan 42 works, it guides the cold air entering from the air inlet mesh to flow through the magnetron 41 and the driving motor 33 in sequence.

When the drawer-type microwave oven works, the first fan 42 draws the cold air into the third spacing region through the air inlet mesh, and the cold air flows through the magnetron 41 and the driving motor 33 in sequence, which can dissipate the heat of the driving motor 33 well, thereby reducing the temperature of the driving motor 33 and ensuring the long-term normal operation of the driving motor 33 and prolonging its service life.

Figure 11:
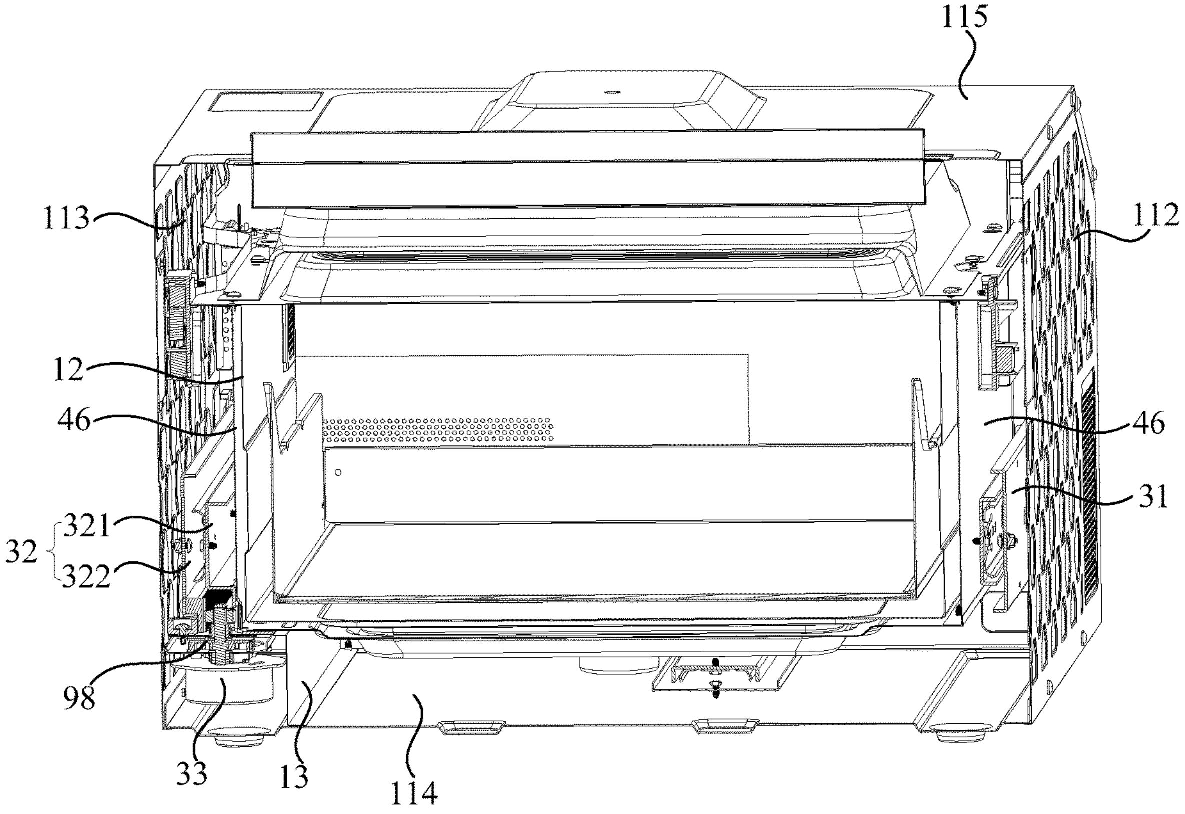
FIG. 11 is a schematic view showing an internal structure of a drawer-type microwave oven according to an embodiment of the present disclosure.

Further, referring to FIG. 11, the housing 11 further includes a bottom cover plate 114 connected to the rear cover plate 111, the first side cover plate 112, and the second side cover plate 113, respectively. A fourth spacing region that is in communication with the second spacing region is formed between the bottom cover plate 114 and a cavity wall of the cooking cavity 12 corresponding with the bottom cover plate. A bottom partition plate 13 is provided in the fourth spacing region, and a bottom space of the first spacing region is separated from a bottom space of the second spacing region by the bottom partition plate 13. The driving motor 33 is arranged at a location where the second spacing region and the fourth spacing region intersect. Specifically, the bottom partition plate 13 extends from the rear cover plate 111 to the opening of the cooking cavity 12. On the premise that the volume of the cooker body 10 is constant, in order to increase the capacity of the cooking cavity 12, the space of the second spacing region is usually small. When the driving motor 33 is arranged at the location where the second spacing region and the fourth spacing region intersect, there is no need to increase the size of the space of the second spacing region, while the driving motor 33 can be mounted between the housing 11 and the cavity wall of the cooking cavity 12. In addition, since the position of the driving motor 33 is arranged reasonably, the ventilation quantity can be increased to a certain extent and the heat dissipation effect can be ensured.

Further, referring to FIGS. 1 to 8, the drawer-type microwave oven further includes a hot air assembly 50 and a front plate 60. The housing 11 further includes a top cover plate 115 connected to the rear cover plate 111, the first side cover plate 112, and the second side cover plate 113, respectively. A fifth spacing region is formed between the top cover plate 115 and a cavity wall of the cooking cavity 12 corresponding with the top cover plate, and the fifth spacing region is in communication with the first spacing region and the second spacing region, respectively. The hot air assembly 50 is arranged in the fifth spacing region. The front plate 60 is arranged around the circumference of the opening of the cooking cavity 12, the bottom of the front plate 60 is provided with a front side air outlet hole 61 penetrating the front plate 60, and the front side air outlet hole 61 is in communication with the first spacing region, and the front plate 60 blocks the second spacing region. When the door is closed, the door 20 is attached to the front plate 60 to seal the opening. Such, the entire air path is as follows: cold air is sucked in by the first fan 42 in the third spacing region, blown through the magnetron 41, and blown to the driving motor 33 in the second spacing region, then blown upward to the hot air assembly 50, and then the cold air flows into the first spacing region, following flows into the bottom space of the first spacing region, and then the cold air is blown out of the cooker body 10 from the front side air outlet hole 61 of the front plate 60. In this way, the heat from the hot air motor 53 within the cooker body 10 including the magnetron 41, the driving motor 33, and the hot air assembly 50 can be dissipated, so that the main electronic parts and components within the cooker body 10 can achieve a good heat dissipation effect.

Figure 4:
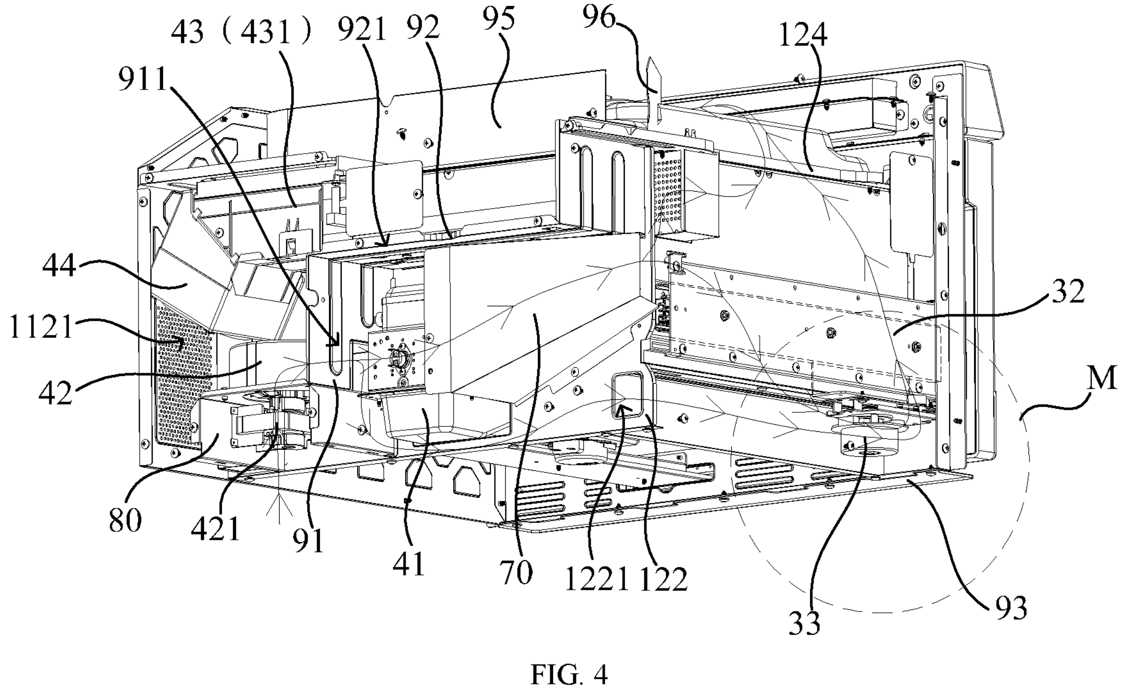
FIG. 4 is a schematic structural view showing a drawer-type microwave oven with a rear cover plate, a second side cover plate, a top cover plate and a bottom cover plate removed according to an embodiment of the present disclosure.
Figure 5:
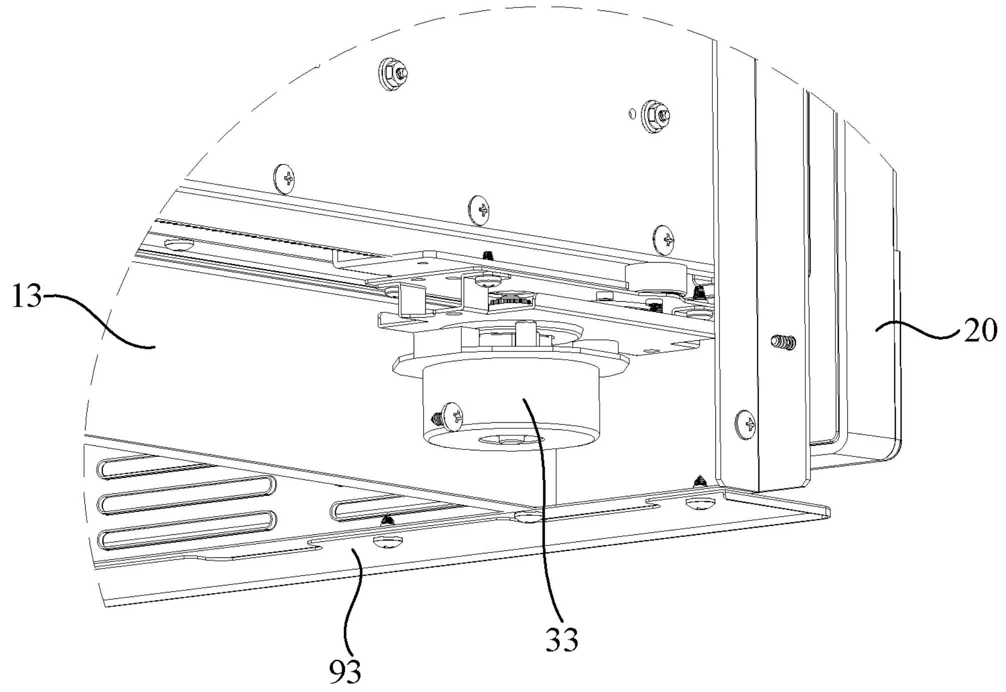
FIG. 5 is a schematic enlarged view showing a M region in FIG. 4.
Figure 6:
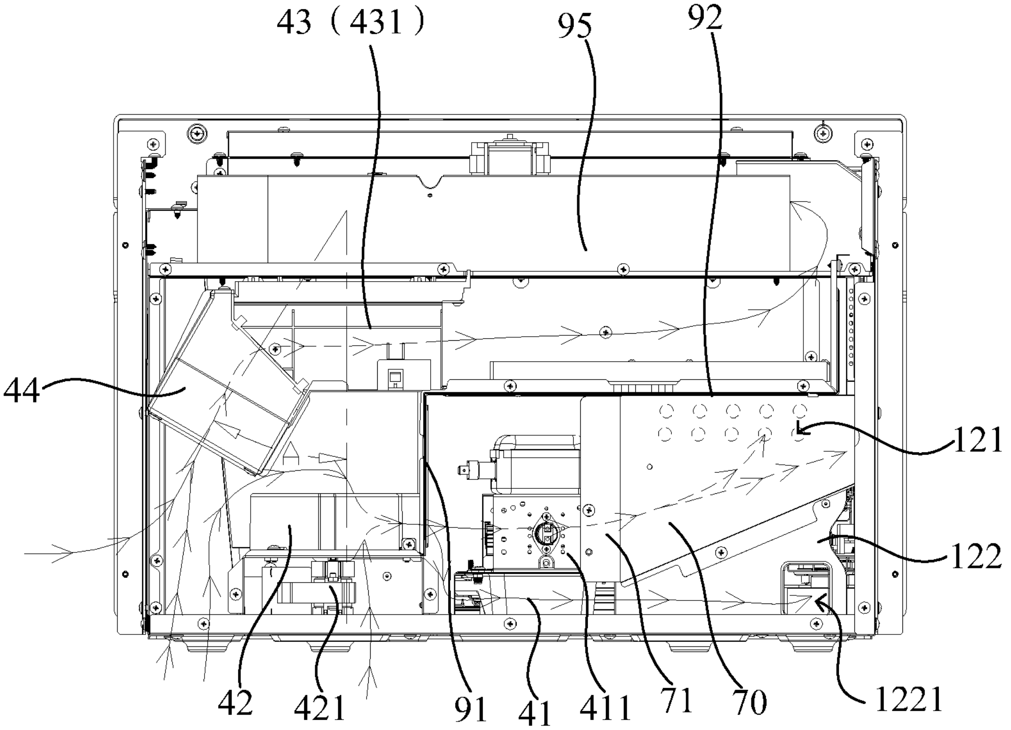
FIG. 6 is a schematic structural view showing a drawer-type microwave oven with a rear cover plate removed according to an embodiment of the present disclosure.
Figure 7:
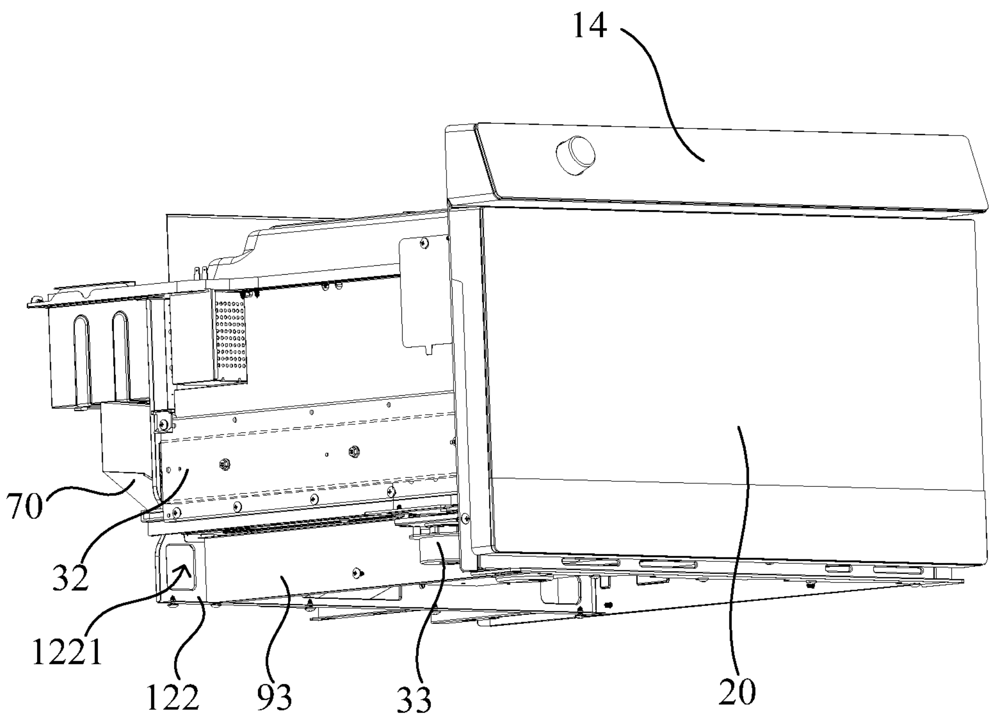
FIG. 7 is another schematic structural view showing a drawer-type microwave oven with a rear cover plate, a second side cover plate, a top cover plate and a bottom cover plate removed according to an embodiment of the present disclosure.
Figure 8:
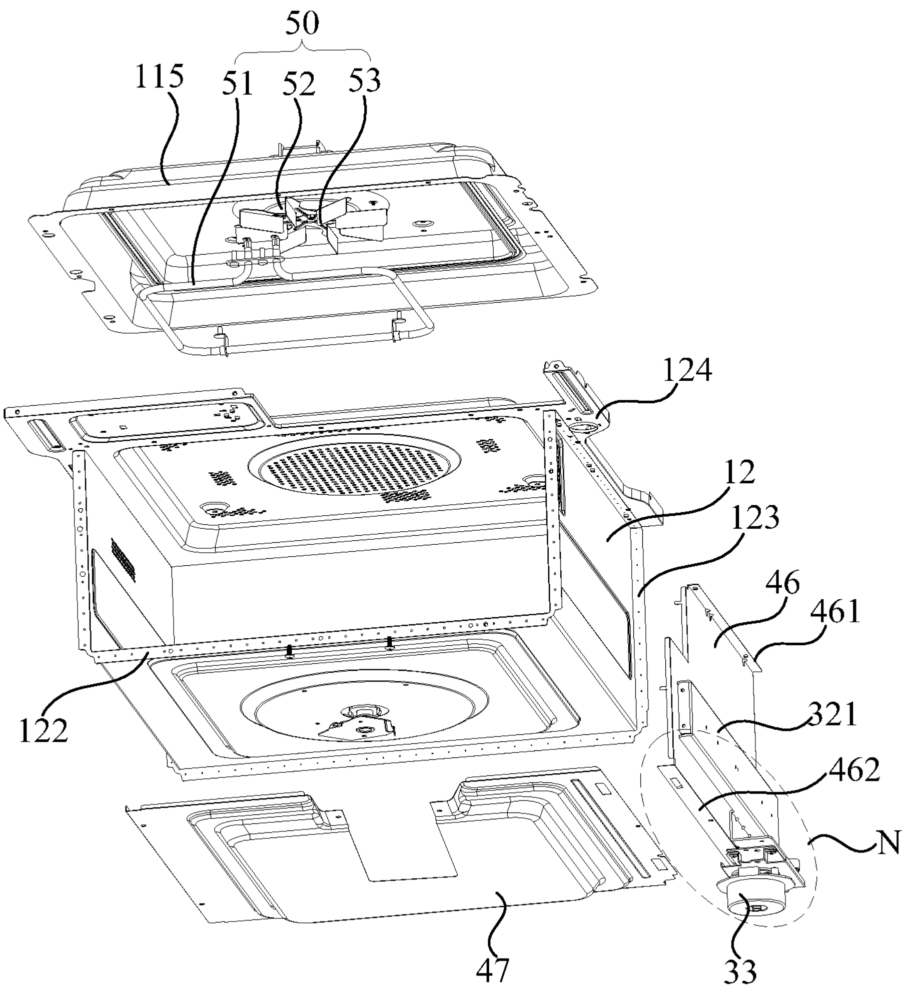
FIG. 8 is a schematic exploded view showing a drawer-type microwave oven according to an embodiment of the present disclosure.
Figure 9:
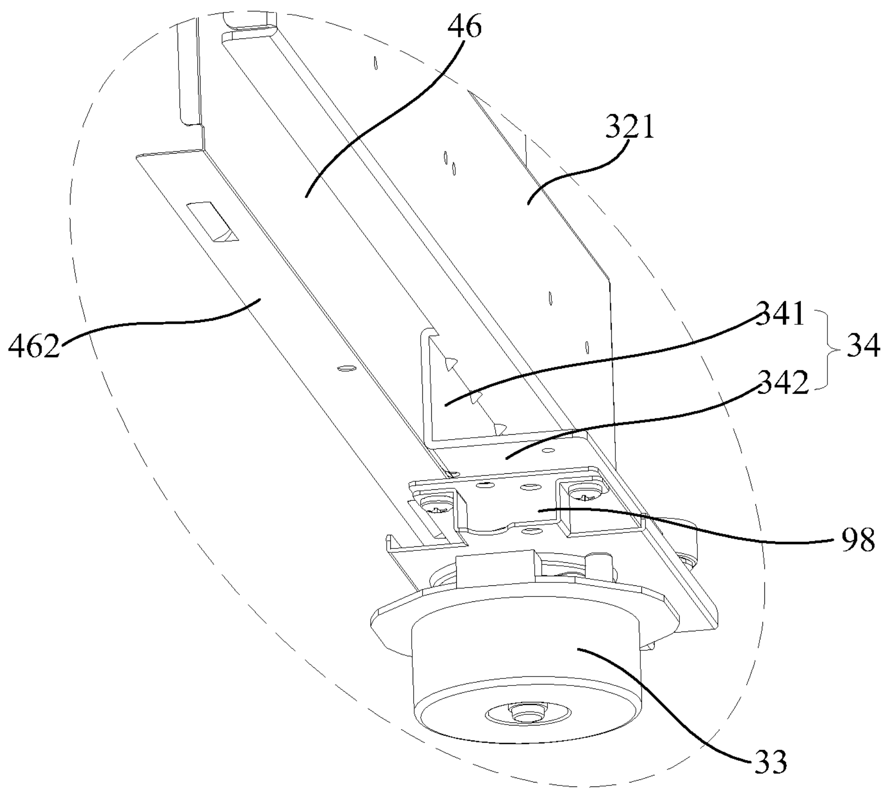
FIG. 9 is a schematic enlarged view showing a N region in FIG. 8.
Figure 10:
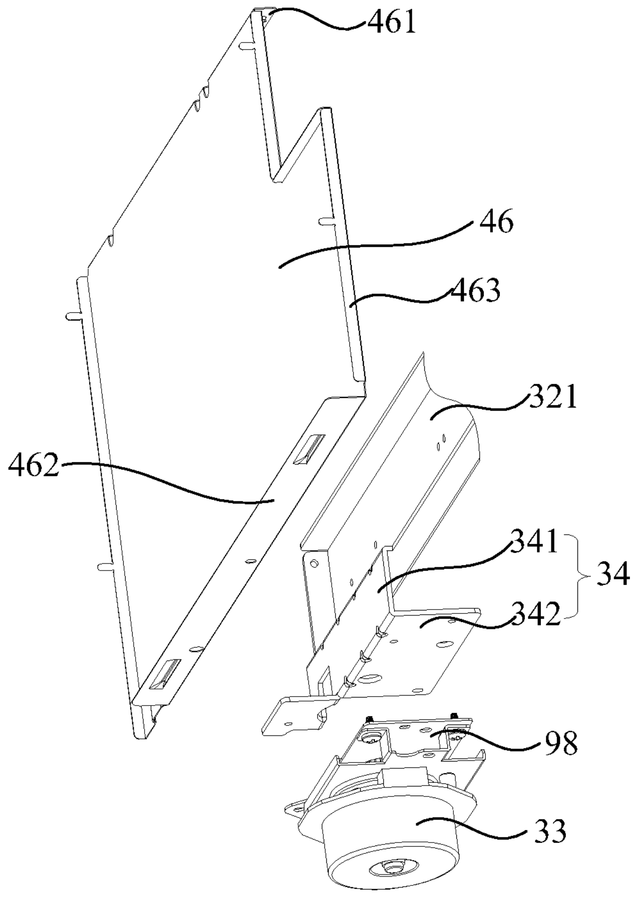
FIG. 10 is a schematic structural view showing a second slide rail and a driving motor of a drawer-type microwave oven according to an embodiment of the present disclosure.

Further, referring to FIGS. 4, 6 and 8, the hot air assembly 50 is provided on the cavity wall of the cooking cavity 12 corresponding with the top cover plate. The hot air assembly 50 includes a heating tube 51, a hot stirring fan 52 with metal fan blades, and a hot air motor 53 driving the hot stirring fan 52. When the air within the third spacing region flows into the fourth spacing region, it can dissipate the heat from the hot air motor 53, preventing heat from being accumulated on the top of the cooker body 10 to affect the control box 14 located on the side of the hot air assembly 50. In addition, the control box 14 is provided on the top cover plate 115. The control box 14 is, for example, arranged on the side of the top cover plate 115 adjacent to the door 20, so as to facilitate the operation of the control box 14. Definitely, the control box 14 may also be arranged at other positions on the top cover plate 115.

Further, referring to FIG. 6, the drawer-type microwave oven further includes a first air guide cover 70. The cavity wall of the cooking cavity 12 corresponding with the rear cover plate is provided with an air intake mesh 121, a radiator shell 411 of the magnetron 41 is provided with a first lateral ventilation flow channel, the first air guide cover 70 covers the air intake mesh 121. An air outlet of the first fan 42, the first lateral ventilation flow channel, and an air inlet of the first air guide cover 70 are in communication in sequence, and an air outlet of the first air guide cover 70 is in communication with the second spacing region. In this way, the air blown from the first fan 42 forms two airs, the first air penetrates the radiator shell 411 of the magnetron 41, then enters the first air guide cover 70, and one part of the air within the first air guide cover 70 enters the cooking cavity 12 through the air inlet mesh 121, and the other part is blown into the second spacing region from the air outlet of the first air guide cover 70 to dissipate the heat from the driving motor 33. The second air passes through the side of the magnetron 41 and the side of the first air guide cover 70 and flows into the second spacing region to further dissipate the heat from the driving motor 33.

Further, referring to FIGS. 8 to 11, the cavity wall of the cooking cavity 12 corresponding with the rear cover plate is provided with a lower edge plate 122 extending below the cooking cavity 12 to the bottom cover plate 114 and a side edge plate 123 extending to the second side cover plate 113. The part of the lower edge plate 122 corresponding to the second spacing region is provided with a first vent 1221, and the second air flows from the first vent 1221 into the second spacing region. The lower edge plate 122 and the side edge plate 123 are conducive to the flow of the air in the second spacing region upward to the fifth spacing region, avoiding the back flow from the second spacing region to the third spacing region and mixed flow.

Further, referring to FIG. 6 and FIGS. 8 to 11, the drawer-type microwave oven further includes a variable frequency power source 43 and a second fan 44. The variable frequency power source 43 and the second fan 44 are both arranged in the third spacing region. The second fan 44 is configured to dissipate the heat of the variable frequency power source 43.

Further, referring to FIGS. 2, 6, 8 to 11, the air inlet mesh includes a side air inlet mesh 1121, a bottom air inlet mesh 1141 and a rear air inlet mesh 1111. One of corner parts of the first side cover plate 112 that is adjacent to the rear cover plate 111 and the bottom cover plate 114 is provided with the side air inlet mesh 1121, one of corner parts of the bottom cover plate 114 that is adjacent to the first side cover plate 112 and the rear cover plate 111 is provided with the bottom air inlet mesh 1141; one of corner parts of the rear cover plate 111 that is adjacent to the first side cover plate 112 and the bottom cover plate 114 is provided with the rear air inlet mesh 1111. The plane where an air inlet of the second fan 44 is located is slantwise arranged relative to the bottom cover plate 114, the plane where the air inlet of the second fan 44 is located faces the side air inlet mesh 1121 and the bottom air inlet mesh 1141, and the plane where an air outlet of the second fan 44 is located is arranged opposite to the variable frequency power source 43, the plane where the air inlet of the first fan 42 is located faces the bottom air inlet mesh 1141, and the plane where the air outlet of the first fan 42 is located is arranged opposite to the magnetron 41.

In this way, on the one hand, the first fan 42 draws the air outside the cooker body 10 through the bottom air inlet mesh 1141 and the rear air inlet mesh 1111, and blows it to the magnetron 41 for heat dissipation, achieving a good heat dissipation effect on the magnetron 41. The second fan 44 draws the air outside the cooker body 10 through the side air inlet mesh 1121, the bottom air inlet mesh 1141 and the rear air inlet mesh 1111, and blows it to the variable frequency power source 43 to dissipate the heat from the variable frequency power source 43. The large amount of air entering has a good heat dissipation effect on the variable frequency power source 43. On the other hand, as the plane where the air inlet of the second fan 44 is located is slantwise arranged relative to the bottom cover plate 114, compared with the horizontal arrangement, the horizontal space occupied by the second fan 44 can be reduced to a certain extent, such that the capacity of the cooking cavity 12 can be increased while the heat dissipation effect can be improved.

Further, referring to FIGS. 2, 6, 8 to 11, the second fan 44 is arranged above the first fan 42, and the angle between the central axis of the second fan 44 and the central axis of the first fan 42 is A, and A is less than 90°. It should be explained that the central axis of the first fan 42 refers to the axis perpendicular to the plane where the air inlet of the first fan 42 is located, and the central axis of the second fan 44 refers to the axis perpendicular to the plane where the air inlet of the second t fan 44 is located. Specifically, the angle A between the central axis of the second fan 44 and the central axis of the first fan 42 is in the range of 30°~40°, preferably, A is 36°.

Further, referring to FIGS. 2, 6, 8 to 11, the first fan 42 is a vortex fan, the upper surface and the lower surface of the vortex fan are both provided with air inlets, the lower surface of the vortex fan is connected with a second air guide cover 80, and the top plate of the second air guide cover 80 is provided with a second vent that is in communication with the air inlet of the lower surface of the vortex fan. An fan motor 421 of the vortex fan is arranged within the second air guide cover 80, the second air guide cover 80 covers a part of the region of the bottom air inlet mesh 1141, and the projection of the second fan 44 on the bottom cover plate 114 along a vertical direction is located on another part of the region of the bottom air inlet mesh 1141. In this way, the second air guide cover 80 can divide the air entering the housing 11 from the bottom air inlet mesh 1141 into two independently isolated air, one of which is sucked in via the air inlet of the first fan 42, and the other is sucked in via the air inlet of the second fan 44, and the two air flows will not be chaotic and partially offset, thus improving the utilization of cold air and ensuring the heat dissipation effect. In addition, the fan motor 421 of the vortex fan is arranged within the second air guide cover 80, the air flow entering into the second air guide cover 80 has a heat dissipation effect on the fan motor 421, thereby increasing the service life of the fan motor 421.

Specifically, the second air guide cover 80 includes two baffles spaced apart from each other and a mounting plate connecting the two baffles. The second vent is opened and formed on the mounting plate. The baffles are connected to the cavity wall of the cooking cavity 12 corresponding with the rear cover plate and the rear cover plate 111, respectively. The motor of the first fan 42 is provided between the two baffles. The region between the two baffles is opposite to the rear air inlet mesh 1111 of the rear cover plate 111, and the air outside may enter between the two baffles via the rear air inlet mesh 1111. In addition, the mounting plate is opposite to the bottom air inlet mesh 1141 of the bottom cover plate 114, and the air outside may also enter the second air guide cover 80 via the bottom air inlet mesh 1141.

Further, referring to FIGS. 2, 4 to 6, a ventilation gap 45 is provided between the first fan 42 and the second fan 44. Thus, a part of the air enters into the second air guide cover 80 via the bottom air inlet mesh 1141 and then enters into the air inlet on the lower surface of the first fan 42, and the other part of the air enters into the housing 11 via the bottom air inlet mesh 1141 and the side air inlet mesh 1121, and enters into the air inlet on the upper surface of the first fan 42 from the ventilation gap between the first fan 42 and the second fan 44, thereby increasing the cold air input from the first fan 42 and having a better heat dissipation effect.

Further, referring to FIGS. 2, 4 to 6, the shell 11 of the variable frequency power source 43 is provided with a second lateral ventilation flow channel, and the air outlet of the second fan 44 is in communication with one of the ports of the second lateral ventilation flow channel, and the outer wall of the other port of the second lateral ventilation flow channel is connected to a vertical partition plate 91 and a lateral partition plate 92. The vertical partition plate 91 and the lateral partition plate 92 are arranged on the periphery of the magnetron 41, the vertical partition plate 91 is provided with a third vent 911, and the air outlet of the first fan 42 is in communication with the third vent 911. In this way, on the one hand, the cold air sent from the air outlet of the second fan 44 enters into the first lateral ventilation flow channel to achieve better heat dissipation for the variable frequency power source 43. On the other hand, under the function of the vertical partition plate 91 and the vertical partition plate 92, the two air flows will not be chaotic and partially offset, thus improving the utilization of cold air and ensuring the heat dissipation effect.

Further, the lateral partition plate 92 is further connected to the cavity wall of the cooking cavity 12 corresponding with the rear cover plate and the rear cover plate 111, respectively. Likewise, the vertical partition plate 91 is further connected to the cavity wall of the cooking cavity 12 corresponding with the rear cover plate and the rear cover plate 111, respectively.

Further, referring to FIGS. 2, 4 to 6, the power connector 412 of the magnetron 41 is arranged adjacent to the lateral partition plate 92, the lateral partition plate 92 is provided with a fourth vent 921 corresponding to the power connector of the magnetron 41, and the fourth vent 921 is located on the side of the lateral partition plate 92 adjacent to the vertical partition plate 91. In this way, after the cold air from the second fan 44 flows out through the second lateral ventilation flow channel, part of the air flows into the space region where the magnetron 41 is located through the fourth vent 921, and when it flows into the region where the magnetron 41 is located from top to bottom, it fully contacts with the magnetron 41 for heat exchange, which can lower the temperature of the magnetron 41 well. In addition, the generation of the whirling air in the region where the magnetron 41 is located can be avoided.

Further, a heat conducting edge 71 is provided at the air inlet of the first air guide cover 70, and the heat conducting edge 71 is attached to the magnetron 41. Specifically, the heat conducting edge 71 is attached to the radiator shell 411 of the magnetron 41, and the heat from the radiator shell 411 of the magnetron 41 is conducted to the first air guide cover 70 by the principle of heat conduction, to improve the heat dissipation effect of the magnetron 41.

The drawer-type microwave oven further includes a container connected with the door 20 for placing cooking materials.

Figure 2:
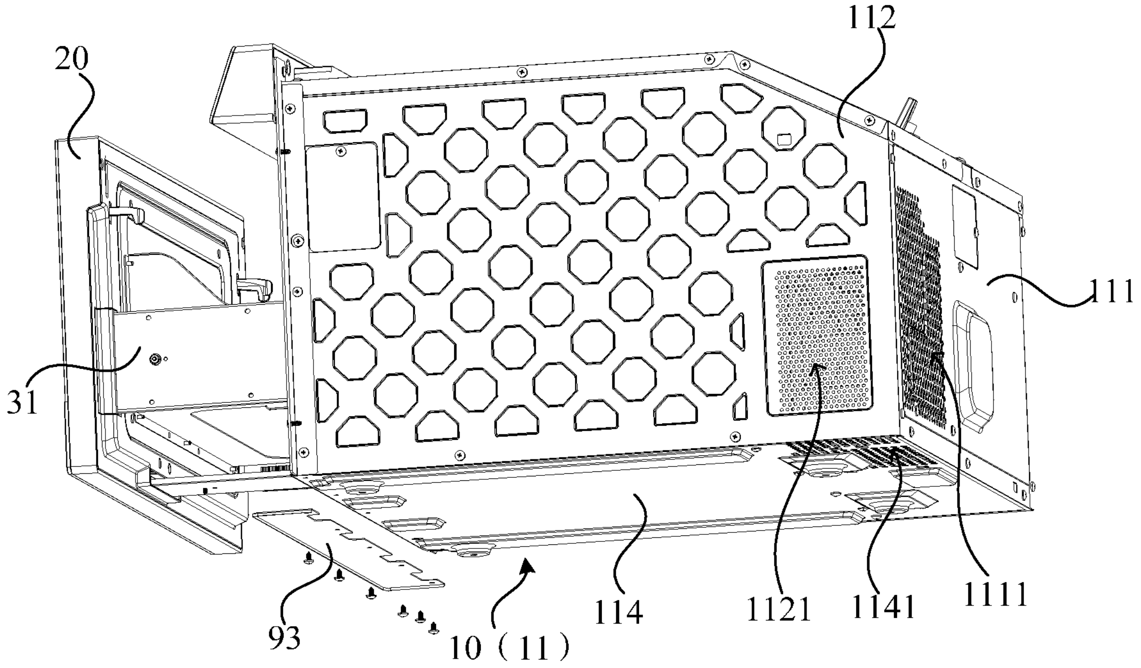
FIG. 2 is another structural view showing a drawer-type microwave oven with a door pull opened according to an embodiment of the present disclosure.
Figure 3:
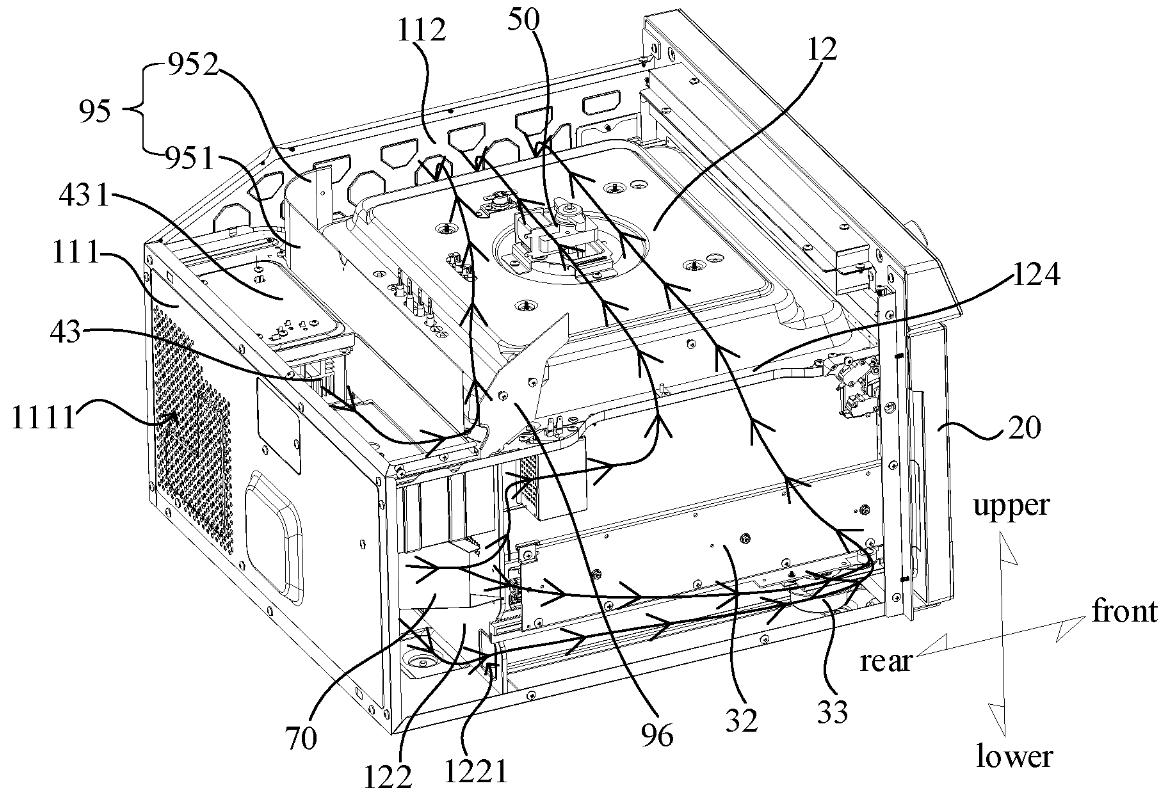
FIG. 3 is a schematic structural view showing a drawer-type microwave oven with a second side cover plate and a top cover plate removed according to an embodiment of the present disclosure.

Further, referring to FIG. 1 and FIG. 2, the drawer-type microwave oven further includes a first partition plate 93. The first partition plate 93 is connected to the bottom edge of the front plate 60 or connected to the side edge of the bottom cover plate 114 adjacent to the opening, the first partition plate 93 is located below the door 20 and forms a front side air outlet 94 with the bottom end of the door 20, and the bottom side of the bottom cover plate 114 is provided with supporting legs 1142 protruding downward, the first partition plate 93 and the supporting surface on which the supporting legs 1142 are placed form a front side air inlet. In this way, the first partition plate 93 can prevent the mixing-flow of the cold air from the front side air inlet and the hot air discharged from the front side air outlet 94, and prevent the hot air discharged from the front side air outlet 94 from directly entering into the front side air inlet and then entering into the cooker body 10, having a better buffering effect, i.e., after the hot air is discharged from the front side air outlet 94, it changes heat with the outside air, and then enters into the cooker body 10 via the front side air inlet. In addition, the hot air discharged from the front side air outlet 94 can be reflected toward the upper front side of the cooker body 10 through the first partition plate 93, so that the hot air is not easy to be sucked in by the front side air inlet.

Further, referring to FIGS. 3 to 6, the side of the cavity wall of the cooking cavity 12 corresponding with the top cover plate away from the door 20 is provided with a lateral surrounding edge 95, the lateral surrounding edge 95 is attached to the top cover plate 115, and two ends of the lateral surrounding edge 95 are spaced apart from the first side cover plate 112 and the second side cover plate 113, respectively. In this way, the lateral surrounding edge 95 separates the hot air assembly 50 from the variable frequency power source 43 and the magnetron 41, which can prevent the heat generated by the hot air assembly 50 from hurtling to the variable frequency power source 43 and the magnetron 41 behind the lateral surrounding edge 95 to affect the normal operation of the variable frequency power source 43 and the magnetron 41.

Further, referring to FIGS. 3 to 6, the lateral surrounding edge 95 includes a main body surrounding edge 951 and an arc-shaped surrounding edge 952 connected to one end of the main body surrounding edge 951, the arc-shaped surrounding edge 952 is used to guide the air to the first spacing region. The cavity wall of the cooking cavity 12 corresponding with the top cover plate is further provided with a guide edge 96, a ventilation interval 97 is provided between the guide edge 96 and another end of the main body 951, and the guide edge 96 extends toward the middle part of the cooking cavity 12. In this way, one part of the air discharged from the second fan 44 flows along the lateral surrounding edge 95 and enters into the first spacing region, and then is discharged outward from the front side air outlet hole 61 of the front plate 60. The other part of the air discharged from the second fan 44 enters into the top of the cooking cavity 12 from the ventilation interval 97, then flows through the hot air assembly 50 and enters into the first spacing region, and then is discharged outward from the front side air outlet hole 61 of the front plate 60.

Further, referring to FIGS. 8 to 11, the drawer-type microwave oven further includes a side heat insulation plate 46 provided in the second spacing region and a bottom heat insulation plate 47 provided in the fourth spacing region. The side heat insulation plate 46 is located between the cavity wall of the cooking cavity 12 corresponding with the second side cover plate and the second slide rail 32, and the bottom of the side heat insulation plate 46 is connected to the bottom heat insulation plate 47. In this way, the side heat insulation plate 46 and the bottom heat insulation plate 47 can prevent the heat on the cooking cavity 12 from being transferred outward in some extent, avoiding the temperature of the second slide rail 32 and the driving motor 33 being too high.

Further, the front end of the fixed rail 321 of the second slide rail 32 is connected to the front plate 60, and the rear end of the fixed rail 321 of the second slide rail 32 is fixedly connected to the side edge plate 123 of the cooking cavity 12.

Further, referring to FIGS. 8 to 11, the cavity wall of the cooking cavity 12 corresponding with the top cover plate has an upper edge plate 124 extending along the direction of the second side cover plate 113, the top of the side heat insulation plate 46 is provided with an upper bending edge 461 connected to the upper edge plate 461, the bottom of the side heat insulation plate 46 is provided with a lower bending edge 462 connected to the bottom heat insulation plate 47. The side of the side heat insulation plate 46 is provided with a blank holder 463 abutting against the cavity wall of the cooking cavity 12 corresponding with the second side cover plate. In this way, the side heat insulation plate 46 can be firmly mounted on the cavity wall of the cooking cavity 12, thereby helping to ensure the stability of the driving motor 33. In addition, the blank holder 463 can lead to forming a space between the side heat insulation plate 46 and the cavity wall of the cooking cavity 12, and can prevent the heat transfer from the cavity wall of the cooking cavity 12 to the side heat insulation plate 46.

Further, referring to FIGS. 8 to 11, the drawer-type microwave oven further includes a mounting bracket 98, the bottom side of the fixed rail 321 of the second slide rail 32 is connected with a connecting part 34. The driving motor 33 is mounted on the mounting bracket 98, and the mounting bracket 98 is connected to the lower bending edge 462 and the connecting part 34, respectively. Specifically, the mounting surface of the connecting part 34 configured to be connected to the mounting bracket 98, and the mounting surface of the lower bending edge 462 configured to be connected to the mounting bracket 98 are flush with each other on the same plane, so that the mounting bracket 98 can be firmly mounted.

Further, referring to FIGS. 8 to 11, the connecting part 34 includes a first connecting plate 341 and a second connecting plate 342. The first connecting plate 341 is connected to the fixed rail 321 of the second slide rail 32, and the second connecting plate 342 is connected to the first connecting plate 341. The first connecting plate 341 abuts against the side heat insulation plate 46 or is arranged adjacent to the side heat insulation plate 46. In this way, on the one hand, the driving motor 33 can be mounted firmly, and on the other hand, the bending of the first connecting plate 341 can be avoided. Further, the driving motor 33 is just located at the location where the second spacing region and the fourth spacing region intersect. The phrase "arranged adjacent to" refers to that there is a distance between the first connecting plate 341 and the side heat insulation plate 46, and the distance is sufficiently small, for example, 1 mm to 5 mm. The specific distance may be set according to actual conditions, and description is omitted.

In order to avoid the too high temperature of the first sliding rail 31 caused by the heat transfer from the cavity wall of the cooking cavity 12 to the first sliding rail 31, similarly, the drawer-type microwave oven further includes a side heat insulation plate 46 provided in the first spacing region. The side heat insulation plate 46 in the first spacing region is located between the cavity wall of the cooking cavity 12 corresponding with the first side cover plate and the first slide rail 31, and the bottom of the side heat insulation plate 46 in the first spacing region is connected to the bottom heat insulation plate 47. In this way, the side heat insulation plate 46 and the bottom heat insulation plate 47 can prevent the heat from the cooking cavity 12 from being transferred outward in some extent, avoiding the temperature of the first slide rail 32 being too high.

Each of the technical features of the above embodiments may be combined arbitrarily. To simplify the description, not all the possible combinations of each of the technical features in the above embodiments are described. However, all of the combinations of these technical features should be considered as within the scope of this disclosure, as long as such combinations do not contradict with each other.

The above-mentioned embodiments are merely illustrative of several embodiments of the present disclosure, which are described specifically and in detail, but it cannot be understood to limit the scope of the present disclosure. It should be noted that, for those ordinary skilled in the art, several variations and improvements may be made without departing from the concept of the present disclosure, and all of which are within the protection scope of the present disclosure. Therefore, the protection scope of the present disclosure shall be defined by the appended claims.

The invention claimed is:

1. A drawer-type microwave oven, comprising:

a cooker body and a door, the cooker body comprising a housing and a cooking cavity provided within the housing, and both of the housing and the cooking cavity being provided with an opening corresponding to the door that is openable to cover the opening, the housing comprising a rear cover plate, a first side cover plate and a second side cover plate arranged oppositely, the first side cover plate and the second side cover plate being both connected to the rear cover plate, a first spacing region being formed between the first side cover plate and a cavity wall of the cooking cavity corresponding with the first side cover plate, and a second spacing region being formed between the second side cover plate and a cavity wall of the cooking cavity corresponding with the second side cover plate, a third spacing region being formed between the rear cover plate and a cavity wall of the cooking cavity corresponding with the rear cover plate, and the third spacing region being in communication with the second spacing region;

a first slide rail, a second slide rail, and a driving motor, the first slide rail and the second slide rail being respectively arranged in the first spacing region and the second spacing region, the driving motor being arranged in the second spacing region, the first slide rail and the second slide rail each comprising a fixed rail fixed on the cooker body and a movable rail slidably arranged on the fixed rail, and the driving motor being configured to drive the movable rail of the second slide rail to move, the movable rail being connected to the door; and a magnetron and a first fan that are arranged in the third spacing region, the housing being provided with an air inlet mesh that is in communication with the third spacing region, cold air entering from the air inlet mesh being guided to flow through the magnetron and the driving motor in sequence when the first fan works;

wherein the housing further includes a bottom cover plate connected to the rear cover plate, the first side cover plate and the second side cover plate, respectively; a fourth spacing region that is in communication with the second spacing region is formed between the bottom cover plate and a cavity wall of the cooking cavity corresponding with the bottom cover plate, a bottom partition plate is provided in the fourth spacing region, and a bottom space of the first spacing region is separated from a bottom space of the second spacing region by the bottom partition plate; the driving motor is arranged at a location where the second spacing region intersects with the fourth spacing region; and the drawer-type microwave oven further includes a hot air assembly and a front plate; the housing further includes a top cover plate connected to each of the rear cover plate, the first side cover plate, and the second side cover plate; a fifth spacing region is formed between the top cover plate and a cavity wall of the cooking cavity corresponding with the top cover plate, and the fifth spacing region is in communication with the first spacing region and the second spacing region, respectively; the hot air assembly is arranged in the fifth spacing region; the front plate is circumferentially arranged around the opening of the cooking cavity, a bottom of the front plate is provided with a front side air outlet hole penetrating the front plate, the front side air outlet hole is in communication with the first spacing region, and the front plate blocks the second spacing region; when the door is closed, the door is attached to the front plate to seal the opening.

2. The drawer-type microwave oven according to claim 1, further comprising a first air guide cover, the cavity wall of the cooking cavity corresponding with the rear cover plate is provided with an air intake mesh, a radiator shell of the magnetron is provided with a first lateral ventilation flow channel, the first air guide cover covers the air intake mesh, an air outlet of the first fan, the first lateral ventilation flow channel, and an air inlet of the first air guide cover are in communication in sequence, and an air outlet of the first air guide cover is in communication with the second spacing region.

3. The drawer-type microwave oven according to claim 2, further comprising a variable frequency power source and a second fan that are arranged in the third spacing region, the second fan is configured to dissipate the heat of the variable frequency power source.

4. The drawer-type microwave oven according to claim 3, wherein the air inlet mesh comprises a side air inlet mesh, a bottom air inlet mesh and a rear air inlet mesh; one of corner parts of the first side cover plate that is adjacent to the rear cover plate and the bottom cover plate is provided with the side air inlet mesh, one of corner parts of the bottom cover plate that is adjacent to the first side cover plate and the rear cover plate is provided with the bottom air inlet mesh; one of corner parts of the rear cover plate that is adjacent to the first side cover plate and the bottom cover plate is provided with the rear air inlet mesh; a plane where an air inlet of the second fan is located is slantwise arranged relative to the bottom cover plate, the plane where the air inlet of the second fan is located faces the side air inlet mesh and the bottom air inlet mesh, and a plane where an air outlet of the second fan is located is arranged opposite to the variable frequency power source, a plane where an air inlet of the first fan is located faces the bottom air inlet mesh, and a plane where the air outlet of the first fan is located is arranged opposite to the magnetron.

5. The drawer-type microwave oven according to claim 3, wherein a side of the cavity wall of the cooking cavity corresponding with the top cover plate away from the door is provided with a lateral surrounding edge, the lateral surrounding edge is attached to the top cover plate, and two ends of the lateral surrounding edge are spaced apart from the first side cover plate and the second side cover plate, respectively.

6. The drawer-type microwave oven according to claim 5, wherein the lateral surrounding edge comprises a main body surrounding edge and an arc-shaped surrounding edge connected to one end of the main body surrounding edge, the arc-shaped surrounding edge is configured to guide the air to the first spacing region; the cavity wall of the cooking cavity corresponding with the top cover plate is further provided with a guide edge, a ventilation interval is provided between the guide edge and another end of the main body surrounding edge, and the guide edge extends toward a middle part of the cooking cavity.

7. The drawer-type microwave oven according to claim 1, further comprising a side heat insulation plate provided in the second spacing region and a bottom heat insulation plate provided in the fourth spacing region; the side heat insulation plate is located between the cavity wall of the cooking cavity corresponding with the second side cover plate and the second slide rail, and a bottom of the side heat insulation plate is connected to the bottom heat insulation plate.

8. The drawer-type microwave oven according to claim 7, wherein a front end of the fixed rail of the second slide rail is connected to the front plate, and a rear end of the fixed rail of the second slide rail is fixedly connected to a side edge plate of the cooking cavity.

9. The drawer-type microwave oven according to claim 7, wherein the cavity wall of the cooking cavity corresponding with the top cover plate has an upper edge plate extending along a direction of the second side cover plate, a top of the side heat insulation plate is provided with an upper bending edge connected to the upper edge plate, the bottom of the side heat insulation plate is provided with a lower bending edge connected to the bottom heat insulation plate; a side of the side heat insulation plate is provided with a blank holder abutting against the cavity wall of the cooking cavity corresponding with the second side cover plate.

10. The drawer-type microwave oven according to claim 9, further comprising a mounting bracket, a bottom side of the fixed rail of the second slide rail is connected to a connecting part, the driving motor is mounted on the mounting bracket, and the mounting bracket is connected to the lower bending edge and the connecting part, respectively.

11. The drawer-type microwave oven according to claim 10, wherein the connecting part comprises a first connecting plate and a second connecting plate, the first connecting plate is connected to the fixed rail of the second slide rail, and the second connecting plate is connected to the first connecting plate; the first connecting plate abuts against the side heat insulation plate or is arranged adjacent to the side heat insulation plate.

* * * * *